United States Patent
Koefod

(10) Patent No.: US 9,309,449 B2
(45) Date of Patent: Apr. 12, 2016

(54) ENVIRONMENTALLY-FRIENDLY IMPROVED DEICER COMPOSITIONS

(71) Applicant: CARGILL, INCORPORATED, Wayzata, MN (US)

(72) Inventor: Robert Scott Koefod, Maple Grove, MN (US)

(73) Assignee: CARGILL, INCORPORATED, Wayzata, MN (US)

( * ) Notice: Subject to any disclaimer, the term of this patent is extended or adjusted under 35 U.S.C. 154(b) by 0 days.

(21) Appl. No.: 14/360,163

(22) PCT Filed: Dec. 5, 2012

(86) PCT No.: PCT/US2012/067957
§ 371 (c)(1),
(2) Date: May 22, 2014

(87) PCT Pub. No.: WO2013/090090
PCT Pub. Date: Jun. 20, 2013

(65) Prior Publication Data
US 2014/0319408 A1    Oct. 30, 2014

Related U.S. Application Data

(60) Provisional application No. 61/576,545, filed on Dec. 16, 2011.

(51) Int. Cl.
*C09K 3/18*    (2006.01)

(52) U.S. Cl.
CPC .. *C09K 3/18* (2013.01); *C09K 3/185* (2013.01)

(58) Field of Classification Search
CPC .................................. C09K 3/18; C09K 3/185
USPC ................................................ 252/70; 106/13
See application file for complete search history.

(56) References Cited

U.S. PATENT DOCUMENTS

| 7,507,349 B2 * | 3/2009 | Koefod ............................ 252/70 |
| 7,658,861 B2 * | 2/2010 | Koefod ............................ 252/70 |
| 2003/0034478 A1 * | 2/2003 | Stanley et al. .................. 252/70 |
| 2004/0256593 A1 | 12/2004 | Hartley et al. |
| 2008/0308764 A1 | 12/2008 | Koefod |
| 2009/0011125 A1 | 1/2009 | Hoerle et al. |

FOREIGN PATENT DOCUMENTS

WO    2011/044135 A1    4/2011

* cited by examiner

*Primary Examiner* — Anthony J Green

(57) ABSTRACT

The present disclosure relates generally to deicer compositions comprising a liquid deicing agent which is as an aqueous solution of a deicing salt and additives that provide reduced corrosiveness with reduced biochemical oxygen demand. Aspects of the disclosure are particularly directed to use of the deicer composition as a liquid deicer or an anti-icer. The deicer composition can further include a solid deicing agent such as sodium chloride, where the liquid deicing agent and additive form a pre-wetting agent when mixed with the solid deicing agent to form a pre-wetted deicer.

13 Claims, No Drawings

ENVIRONMENTALLY-FRIENDLY IMPROVED DEICER COMPOSITIONS

CROSS REFERENCE TO RELATED APPLICATIONS

This application is a section 371 national-stage phase of International Application No. PCT/US12/067957, filed 5 Dec. 2012, titled "ENVIRONMENTALLY-FRIENDLY IMPROVED DEICER COMPOSITIONS" which claims priority to U.S. Application Ser. No. 61/576,545, filed 16 Dec. 2011, titled "ENVIRONMENTALLY-FRIENDLY IMPROVED DEICER COMPOSITIONS," which are hereby incorporated by reference in their entirety.

FIELD

The present application relates generally to environmentally-friendly deicing compositions with reduced corrosiveness that provide a reduced biochemical oxygen demand, comprising a liquid deicing agent and additives that provide reduced corrosiveness. Aspects of the disclosure are particularly directed to the use of the composition as a deicer, an anti-icer, or a pre-wetting agent.

BACKGROUND

This application relates to deicer compositions with a reduced environmental impact. More particularly, the application relates to deicer compositions with reduced corrosiveness and biochemical oxygen demand that can be used as a liquid deicer, a pre-wetting agent when mixed with a deicing salt to form a pre-wetted deicer, or an anti-icer.

There is an ever present challenge to develop deicer formulations which are more effective and at the same time have a reduced impact on both the natural environment and infrastructure. In particular, there is a strong desire to find deicer compositions that have reduced biochemical oxygen demand (BOD) on water systems. Varieties of additives for deicers are currently used but have limitations. For instance, inorganic compounds such as phosphate and chromate based corrosion inhibitors are used. However, these compounds have undesirable environmental impact. Hexavalent chromium compounds are genotoxic carcinogens. Phosphates can contribute to eutrophication of lakes and streams. Others have developed deciers that have used organic compounds as additives. Examples include desugared beet molasses (U.S. Pat. No. 7,473,379), honey (U.S. Pat. No. 6,616,739), low molecular weight carbohydrates (U.S. Pat. No. 6,299,793), and molasses (U.S. Pat. No. 6,596,188). However, organic additives are not without their own potential for detrimental environmental impact. In particular, the types of organic additives commonly used in deicers are usually readily biodegradable, resulting in the potential for increased biochemical oxygen demand (BOD) when these additives get into natural waters. Increased BOD can impair the living ecosystem in natural waters, resulting in death of fish and other aquatic organisms if BOD is sufficiently high. Thus, it is desirable to identify additive systems for deicers that have reduced BOD.

Deicer compositions can include a liquid deicing agent combined with at least one corrosion inhibiting additive and at least one viscosifying additive. The deicing composition can be used in a variety of ways, including alone as an anti-icer or deicer, or as a pre-wetting agent to combine with a solid deicing agent to form a pre-wetted deicer. When used as anti-icers they are applied directly to a surface prior to a snow storm or ice event. They serve to interrupt the boundary layer of snow between the surface and the accumulated snow pack, thereby preventing the snow from bonding to the surface and facilitating its removal by snow plows. The deicer composition can also be used as a deicer to melt snow or ice that has already accumulated on a surface. The deicer composition can also be used as a pre-wetting agent having a liquid deicing agent either alone or with additives that are added to or blended with a solid deicing agent to yield a pre-wetted deicer. The solid deicing agent can include compounds such as urea or a sodium, potassium, magnesium, calcium or ammonium salt of chloride, carbonate, lactate, succinate, acetate, propionate, formate, or combinations thereof. Examples include, but are not limited to, sodium chloride, magnesium chloride, calcium chloride, potassium chloride, potassium carbonate, urea, sodium acetate, potassium acetate, ammonium acetate, calcium magnesium acetate, sodium formate, potassium formate, potassium lactate, sodium lactate, sodium succinate, potassium succinate or combinations thereof. The pre-wetting agent can be sprayed onto the solid deicing agent or preferably it is pre-blended with the solid deicing agent. This allows those applying the deicer compositions to the road to use the same standard equipment and trucks that used when applying dry salts to the road.

The present invention allows for a reduced environmental impact while still providing an effective deicer composition. Surprisingly, it has been found that certain combinations of additives can provide effective corrosion inhibition at reduced BOD levels, such as when utilizing a corrosion inhibiting additive such as gluconate with a viscosifying additive such as xanthan gum in chloride deicers, which provides corrosion protection at even lower BOD levels than is possible with either additive by itself or compared to other additives.

SUMMARY

The present disclosure relates to a deicer composition comprising a liquid deicing agent and additives to inhibit corrosion. The deicer composition can include a combination of additives, such as a viscosifying additive such as xanthan gum and a corrosion inhibiting additive such as sodium gluconate, together with a liquid deicing agent comprising an aqueous solution of a deicing salt including a chloride salt such as sodium chloride, potassium chloride, magnesium chloride, calcium chloride, or combinations thereof, or the liquid deicing agent can be liquid bittern. Other performance enhancers can be added to the deicer composition, such as radiation absorbers. The deicer combination can be used as an anti-icer which can be applied before a snow or ice event, a deicer which can be applied during or after a snow or ice event, or can be used as a pre-wetting agent applied to a solid deicing agent to form a pre-wetted deicer.

One embodiment is directed toward a deicer composition comprising a liquid deicing agent, a corrosion inhibiting additive, and a viscosifying additive, where the liquid deicing agent comprises an aqueous solution of a deicing salt, where the corrosion inhibiting additive comprises gluconic acid, saccharic acid, gluconate salts, saccharate salts or combinations thereof, and the viscosifying agent comprises xanthan gum, cellulose gum, polyvinyl pyrrolidone, acrylic acid polymers, cross linked acrylic polymers, polyether polyols, sodium carboxymethyl cellulose, hydroxyethyl cellulose, carboxymethyl hydroxypropyl guar, hydroxypropyl guar, polyanionic cellulose, pregelatinized crosslinked starch such as hydroxypropyl distarch phosphate and distarch phosphate, scleroglucan, pectin or combinations thereof. In one embodiment, deicing salts can include sodium chloride, magnesium chloride, calcium chloride, potassium chloride, or combinations of these salts. The liquid deicing agent can also be comprised of liquid bittern, which is a product derived from sea salt production, and is the liquid remaining after sodium chloride is removed from the sea water. In one embodiment, the corrosion inhibiting additive is sodium gluconate and the viscosifying additive is xanthan gum.

The deicer composition can further comprise a solid deicing agent, such as sodium chloride, magnesium chloride, magnesium chloride hydrate, calcium chloride, calcium chloride hydrate, potassium chloride, urea, potassium acetate, sodium acetate, calcium magnesium acetate, sodium formate, potassium formate, or combinations thereof. As used herein, the terms "magnesium chloride hydrate" and "calcium chloride hydrate" refer to solid hydrated magnesium chloride and calcium chloride, respectively. The amount of hydration can vary from monohydrate to hexahydrate or higher. In this embodiment, the liquid deicing agent and additives form a pre-wetting agent that is mixed with the solid deicing agent to form a pre-wetted deicer. The most common solid deicing agent is sodium chloride, which is often mined as rock salt. In another embodiment, the deicer composition further comprises a radiation absorber.

DETAILED DESCRIPTION

Selected Definitions

As used herein, the following terms shall have the following meanings:

The term "deicer composition" as used herein is a combination of compounds used to melt snow or ice, or prevent snow or ice from bonding to a surface. A deicer composition can include a liquid deicer, a pre-wetting agent, a deicer, an anti-icer, or a pre-wetted deicer.

The term "deicing agent" as used herein refers either to a liquid deicing agent or a solid deicing agent.

The term "liquid deicing agent" as used herein is an aqueous solution of a deicing salt. A liquid deicing agent can be a mixture of water and a deicing salt. It can also be a liquid bittern, which is a naturally-occurring mixture of magnesium chloride, sea water, and other compounds. The liquid deicing agent can be used as a deicer, as an anti-icer, or it can be used as a pre-wetted deicing agent when mixed with a solid deicing agent to form a pre-wetted deicer.

The term "viscosifying additive" as used herein is a compound that is added to or mixed with a liquid deicing agent to increase its viscosity. Suitable additives include xanthan gum, cellulose gum, polyvinyl pyrrolidone, acrylic acid polymers, cross linked acrylic polymers, polyether polyols, sodium carboxymethyl cellulose, hydroxyethyl cellulose, carboxymethyl hydroxypropyl guar, hydroxypropyl guar, polyanionic cellulose, pregelatinized crosslinked starch such as hydroxypropyl distarch phosphate and distarch phosphate, scleroglucan, pectin or combinations thereof.

The term "deicing salt" as used herein is a chloride salt. The deicing salt can be mixed with water to form an aqueous solution referred to as a liquid deicing agent. The deicing salt of a liquid deicing agent can be a salt such as sodium chloride, magnesium chloride, magnesium chloride hydrates, calcium chloride, calcium chloride hydrates, potassium chloride, or combinations of these salts.

The term "solid deicing agent" as used herein is a compound primarily in solid form such as urea or a sodium, potassium, magnesium, calcium or ammonium salt of chloride, carbonate, lactate, succinate, acetate, propionate, formate, or combinations thereof. Examples include, but are not limited to, sodium chloride, magnesium chloride, calcium chloride, potassium chloride, potassium carbonate, urea, sodium acetate, potassium acetate, ammonium acetate, calcium magnesium acetate, sodium formate, potassium formate, potassium lactate, sodium lactate, sodium succinate, potassium succinate or combinations thereof. The most commonly used solid deicing agent is sodium chloride, which is mined as rock salt, but can also include salts collected from brines such as sea water, underground saltwater sources, or salt water lakes.

The term "liquid bittern" as used herein is a product derived from sea salt production, and is the liquid remaining after the partial removal of sodium chloride from sea water. Liquid bittern normally contains water along with a high concentration of magnesium chloride and lower concentrations of other salts.

The term "pre-wetting agent" as used herein is an aqueous solution of a compound or a mixture of compounds, such as a liquid deicing agent and additives, which can be added to a solid deicing agent.

The term "pre-wetted deicer" as used herein is a solid deicing agent that is treated with a pre-wetting agent prior to application to a surface. A pre-wetted deicer is sometimes referred to in the industry as a treated salt.

The term "corrosion inhibitor" as used herein is a compound that is added to or is a part of a deicer composition to reduce the corrosion to metals, and particularly to mild steel.

Deicer Composition

In one embodiment, the deicer composition of the present invention comprises a mixture of a liquid deicing agent, a corrosion inhibiting additive, and a viscosifying additive. In one embodiment, the liquid deicing agent comprises liquid bittern or an aqueous solution of a deicing salt wherein the deicing salt comprises a chloride salt such as sodium chloride, magnesium chloride, calcium chloride, potassium chloride, liquid bittern, or combinations thereof, wherein the corrosion inhibiting additive can include gluconic acid, saccharic acid, gluconate salts, saccharate salts, or combinations thereof, and the viscosifying additive comprises xanthan gum, cellulose gum, polyvinyl pyrrolidone, acrylic acid polymers, cross linked acrylic polymers, polyether polyols, sodium carboxymethyl cellulose, hydroxyethyl cellulose, carboxymethyl hydroxypropyl guar, hydroxypropyl guar, polyanionic cellulose, pregelatinized crosslinked starch such as hydroxypropyl distarch phosphate and distarch phosphate, scleroglucan, pectin or combinations thereof. In a further embodiment, the corrosion inhibiting additive is sodium gluconate and the viscosifying additive is xanthan gum. In one embodiment, the deicer composition can include performance enhancers such as radiation absorbers. In one embodiment, the concentration of the deicing salt of the liquid deicing agent is between about 10% to about 45% by weight in solution, the concentration of the corrosion inhibiting additive is between about 0.05% to about 10.0% by weight, and the concentration of viscosifying additive is between about 0.05% and about 5.0% by weight. In another embodiment, the concentration of the deicing salt of the liquid deicing agent is between about 10% to about 45% by weight in solution, the concentration of the corrosion inhibiting additive is between about 0.1% to about 5.0% by weight, and the concentration of viscosifying additive is between about 0.1% and about 1.0% by weight. In yet another embodiment, the concentration of the deicing salt of the liquid deicing agent is between about 10% to about 45% by weight in solution, the concentration of the corrosion inhibiting additive is between about 0.15% to about 0.5% by weight, and the concentration of viscosifying additive is between about 0.15% and about 0.5% by weight.

In another embodiment, the corrosion inhibiting additive comprises sodium gluconate and the viscosifying additive comprises xanthan gum.

In one embodiment, the deicer composition comprises a liquid deicing agent, a corrosion inhibiting additive, a viscosifying additive and a solid deicing agent to form a pre-wetted deicer. The solid deicing agent can include compounds such as urea or a sodium, potassium, magnesium, calcium or ammonium salt of chloride, carbonate, lactate, succinate, acetate, propionate, formate, or combinations thereof. Examples include, but are not limited to, sodium chloride, magnesium chloride, calcium chloride, potassium chloride, potassium carbonate, urea, sodium acetate, potassium acetate, ammonium acetate, calcium magnesium acetate, sodium formate, potassium formate, potassium lactate, sodium lactate, sodium succinate, potassium succinate or combinations thereof. In another embodiment, the liquid deicing agent is present in a concentration of between about 0.5% and about 20.0% by weight and the solid deicing agent is present in a concentration of between about 80.0% and about 99.5% by weight. In another embodiment, the liquid deicing agent is present in a concentration of between about 0.5% and about 10.0% by weight and the solid deicing agent is present in a concentration of between about 90.0% and about 99.5% by weight. In another embodiment, the liquid deicing agent is present in a concentration of between about 0.5% and about 5.0% by weight and the solid deicing agent is present in a concentration of between about 95.0% and about 99.5% by weight. In one embodiment, the composition further comprises a radiation absorber. In another embodiment, the radiation absorber comprises Naphthol Green B, Liquitint® Green HMC, Liquitint® Patent Blue, Liquitint® Yellow LP, Sensient Emerald Green Liquid, FDC Blue 1, FDC Yellow 5, FDC Red 40, or combinations thereof. In another embodiment, the radiation absorber is present in a concentration of between about 0.001% and about 0.02%. In another embodiment, the radiation absorber is present in a concentration of between about 0.001% to about 0.01% by weight.

Liquid Deicing Agents

The liquid deicing agent of the deicing composition is a substance having at least one component such as a deicing salt which, when combined with ice, will lower the freezing point of the ice permitting it to melt at lower temperatures. For example, sodium chloride can lower the freezing point of water to as low as −21.2 degrees Celsius. Other deicing salts can also be used to form the liquid deicing agent such as sodium chloride, magnesium chloride, calcium chloride, potassium chloride, or combinations thereof.

Liquid bittern can also be used as a liquid deicing agent. In one embodiment, the liquid bittern contains between about 20 and about 35 percent by weight magnesium chloride. Liquid bittern containing other concentrations, such as less than about 20 percent by weight magnesium chloride, can also be used.

Additives

Suitable corrosion inhibiting additives to be mixed with the liquid deicing agent to form the deicer composition include gluconic acid, saccharic acid, gluconate salts, and saccharate salts. Suitable viscosifying additives to be mixed with the liquid deicing agent to form the deicer composition include xanthan gum, cellulose gum, polyvinyl pyrrolidone, acrylic acid polymers, cross linked acrylic polymers, polyether polyols, sodium carboxymethyl cellulose, hydroxyethyl cellulose, carboxymethyl hydroxypropyl guar, hydroxypropyl guar, polyanionic cellulose, pregelatinized crosslinked starch such as hydroxypropyl distarch phosphate and distarch phosphate, scleroglucan, pectin or combinations thereof. In one embodiment, the corrosion inhibiting additive is sodium gluconate and the viscosifying additive is xanthan gum. The corrosion inhibiting additive can be in the amount of between about 0.05% to about 10.0% by weight and the viscosifying additive can be in the amount of between about 0.05% and about 5.0% by weight. In other embodiments, the concentration of the corrosion inhibiting additive is between about 0.15% to about 5.0% by weight or between about 0.1% to about 0.5% by weight and the concentration of the viscosifying additive is between about 0.15% to about 1.0% by weight or between about 0.1% to about 0.5% by weight. The additives can be added to the liquid deicing agent as direct dry additives.

In another embodiment, the deicer composition comprises a liquid deicing agent, sodium gluconate, and xanthan gum. In one embodiment, the deicer composition contains between about 0.05% to about 5.0% by weight sodium gluconate and between about 0.05% to about 0.5% xanthan gum dispersed into an aqueous solution of between about 10% to about 60% by weight of a deicing salt. In another embodiment, the deicer composition contains between about 0.15% to about 1.0% by weight sodium gluconate and between about 0.1% to about 0.4% xanthan gum dispersed into an aqueous solution of between about 25% to about 33% by weight magnesium chloride. The deicer composition can optionally include a radiation absorber, such as a dye.

Deicing Salts

Deicing salts can include chloride salts, which can be mixed with water to form an aqueous solution referred to as a liquid deicing agent. Deicing salts can include sodium chloride, magnesium chloride, calcium chloride, potassium chloride, or combinations of these salts. In one embodiment, the solid deicing salt is sodium chloride mixed with water to form the liquid deicing agent. In another embodiment, the deicing salt is magnesium chloride.

Performance Enhancers

The compositions discussed in the present disclosure can optionally include a radiation absorber. Radiation absorbers include chemicals with a high molar absorptivity in the infrared, visible and/or ultraviolet portions of the spectrum and exhibit high quantum yields for internal conversion, thereby efficiently converting absorbed solar radiation to heat. Compounds of this type include certain dyes.

In one embodiment, Naphthol Green B dye can be used as a radiation absorber in accordance with the present disclosure. Examples of other radiation absorbers include Liquitint® Green HMC, Liquitint® Patent Blue, Liquitint® Yellow LP (available from Milliken Chemical, Spartanburg, S.C.), Emerald Green Liquid (available from Sensient Technologies, Milwaukee, Wis.), FDC Blue 1, FDC Yellow 5, FDC Red 40, or combinations thereof. In one embodiment where the radiation absorber is added to the deicer composition, the radiation absorber is present in an amount of between about 0.02% and about 0.50% by weight. In another embodiment where the radiation absorber is added to the deicer composition further comprising a solid deicing agent, the radiation absorber is present in an amount of between about 0.001% to about 0.02% by weight. In another embodiment, a combination of FDC Blue 1, FDC Yellow 5, and FDC Red 40 is suitable for use as a radiation absorber (available as "Green Blend 1137" from Rainbow Specialty Colors, Inc.).

EXAMPLES

Aspects of certain methods in accordance with aspects of the invention are illustrated in the following examples.

Example 1

Corrosion tests were run according to the following procedure: the test coupons used are ASTM F 436, Type 1 flat steel washers with approximate dimensions 1.38 in. outer diameter, 0.56 in. inner diameter, and 0.11 in. thick with a density of approximately 7.85 grams per cubic centimeter and a Rockwell Hardness of C 38-45. Coupons are wiped with hexane to remove grease and oil and then acetone rinsed. The coupons are removed from the acetone, allowed to air dry and then weighed to the nearest 0.1 mg.

The liquid deicer formulations are diluted 50/50 with deionized water, and approximately 360 grams of each diluted deicer solution is put into a 500 milliliter Erlenmeyer flask. Each flask is equipped with a rubber stopper that has been drilled to allow a line to run through it. Three coupons are mounted in a plastic holder that is suspended inside the flask through the stopper hole. A timed device raises and lowers the test coupons so that they are completely immersed in the test solutions for 10 minutes and then raised so they are suspended within the flask and above the test solution for 50 minutes. This cycle is repeated for 68-72 hours, depending on the test. Tests are conducted at room temperature. At the end of the exposure period the coupons are removed from the test solutions and scrubbed with a nylon brush under running water to remove coarse corrosion products. They are then immersed in a cleaning solution of approximately 3.8% hydrochloric acid and 0.1% Rodine 213 in warm tap water for approximately 20 minutes. The coupons are then removed, scrubbed again with a nylon brush under running water, immersed in an acetone bath and allowed to air dry. The coupons are then re-weighed to the nearest 0.1 mg. Fresh coupons that have not been exposed to the test solutions are also taken through the same cleaning procedure to determine the weight loss due to the cleaning process. The weight loss due to cleaning is subtracted from the total weight loss of the test coupons to determine the actual corrosion weight loss. A corrosion rate in mils per year is calculated from the measured coupon weight loss using the formula: mils per year=(weight loss of coupons in milligrams×534)/(coupon area in square cm×test exposure time in hours×density of coupons).

TABLE 1

Corrosion Rates and BOD of Deicer Compositions on Mild Steel

| % $MgCl_2$ | % Xanthan Gum | % Na Gluconate | BOD (ppm) | Corrosion Rate (mils per year) |
|---|---|---|---|---|
| 26.0 | 0 | 0 | 0 | 12.9 |
| 26.0 | 0 | 0.6 | 3,042 | 6.2 |
| 26.0 | 0.6 | 0.15 | 1,961 | 5.6 |
| 26.0 | 0.6 | 0 | 1,200 | 8.1 |

BOD values in Table 1 are calculated assuming a BUD of 507,000 ppm for sodium gluconate and a BOD of 200,000 ppm for xanthan gum. The data in Table 1 show that combining xanthan gum and sodium gluconate makes it possible to achieve corrosion inhibition levels at lower BOD levels than by using sodium gluconate as the lone corrosion inhibiting additive. Similarly, only using an additive such as xanthan gum does not provide sufficient corrosion protection. Surprisingly, by using sodium gluconate and xanthan gum together in a liquid magnesium chloride deicer it is possible to maximize corrosion inhibition and at the same time minimize the BUD impact on waterways. This combination of a corrosion inhibiting additive and a viscosifying additive provides corrosion protection for deicer handling equipment while at the same time providing a reduced environmental impact on waterways, aquatic ecosystems and aquatic organisms by reducing the impact from BOD.

The particular embodiments disclosed above are illustrative only, as the present disclosure can be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above can be altered or modified and all such variations are considered within the scope and spirit of the present disclosure.

I claim:

1. A deicer composition comprising:
   a. a liquid deicing agent, wherein the liquid deicing agent comprises an aqueous solution of a deicing salt or liquid bittern comprising magnesium chloride; and
   b. a corrosion inhibiting additive of about 0.05% to about 0.5% by weight, wherein the corrosion inhibiting additive is sodium gluconate; and
   c. a viscosifying additive that is xanthan gum.

2. The composition of claim 1, wherein the concentration of the deicing salt is between about 10% to about 45% by weight in solution, and the concentration of the viscosifying additive is between about 0.05% to about 5.0% by weight.

3. The composition of claim 1, wherein the concentration of the deicing salt is between about 10% to about 45% by weight in solution, and the concentration of the viscosifying additive is between about 0.1% to about 2.0% by weight.

4. The composition of claim 1, wherein the concentration of the deicing salt is between about 10% to about 45% by weight in solution, the concentration of the corrosion inhibiting additive is between about 0.15% to about 0.5% by weight, and the concentration of the viscosifying additive is between about 0.15% to about 0.5% by weight.

5. The composition of claim 1, further comprising a solid deicing agent.

6. The composition of claim 5, wherein the solid deicing agent is selected from the group consisting of urea, chloride salts, acetate salts, formate salts, and combinations thereof.

7. The composition of claim 6, wherein the concentration of the liquid deicing agent is between about 0.5% and about 20.0% by weight and the concentration of the solid deicing agent is between about 80.0% and about 99.5% by weight.

8. The composition of claim 6, wherein the concentration of the liquid deicing agent is between about 0.5% and about 10.0% by weight and the concentration of the solid deicing agent is between about 90.0% and about 99.5% by weight.

9. The composition of claim 6, wherein the concentration of the liquid deicing agent is between about 0.5% and about 6.0% by weight and the concentration of the solid deicing agent is between about 94.0% and about 99.5% by weight.

10. The composition of claim 2, further comprising a radiation absorber.

11. The composition of claim 10, wherein the radiation absorber comprises Naphthol Green B, Emerald Green Liquid, FDC Blue 1, FDC Yellow 5, FDC Red 40, or combinations thereof.

12. The composition of claim 11, wherein the radiation absorber is present in a concentration of between about 0.02% and about 0.5% by weight.

13. The composition of claim 6, wherein:
   the chloride salts are selected from the group consisting of sodium chloride; magnesium chloride, calcium chloride, potassium chloride, calcium chloride hydrate, magnesium chloride hydrate, and combinations thereof;

the acetate salts are selected from the group consisting of potassium acetate, calcium magnesium acetate, sodium acetate, and combinations thereof; and the formate salts are selected from the group consisting of sodium formate, potassium formate, and combinations thereof.

\* \* \* \* \*